Nov. 5, 1957 C. C. GROTNES 2,812,002
APPARATUS FOR OPENING A HOLLOW FLATTENED CYLINDRICAL BODY
Filed June 13, 1952 3 Sheets-Sheet 1
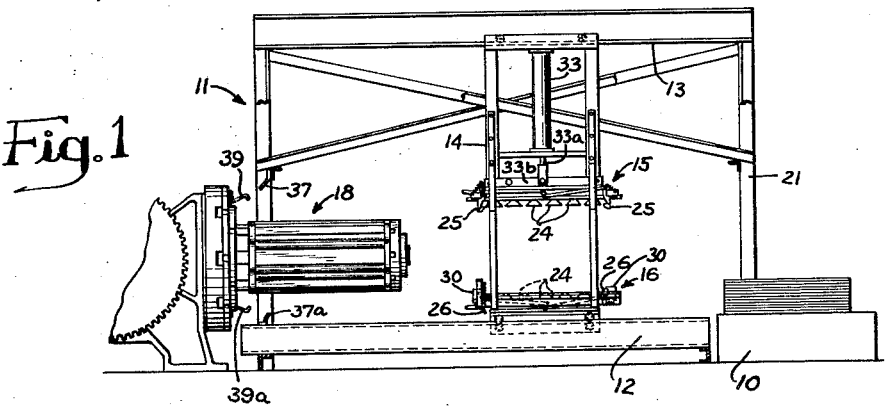
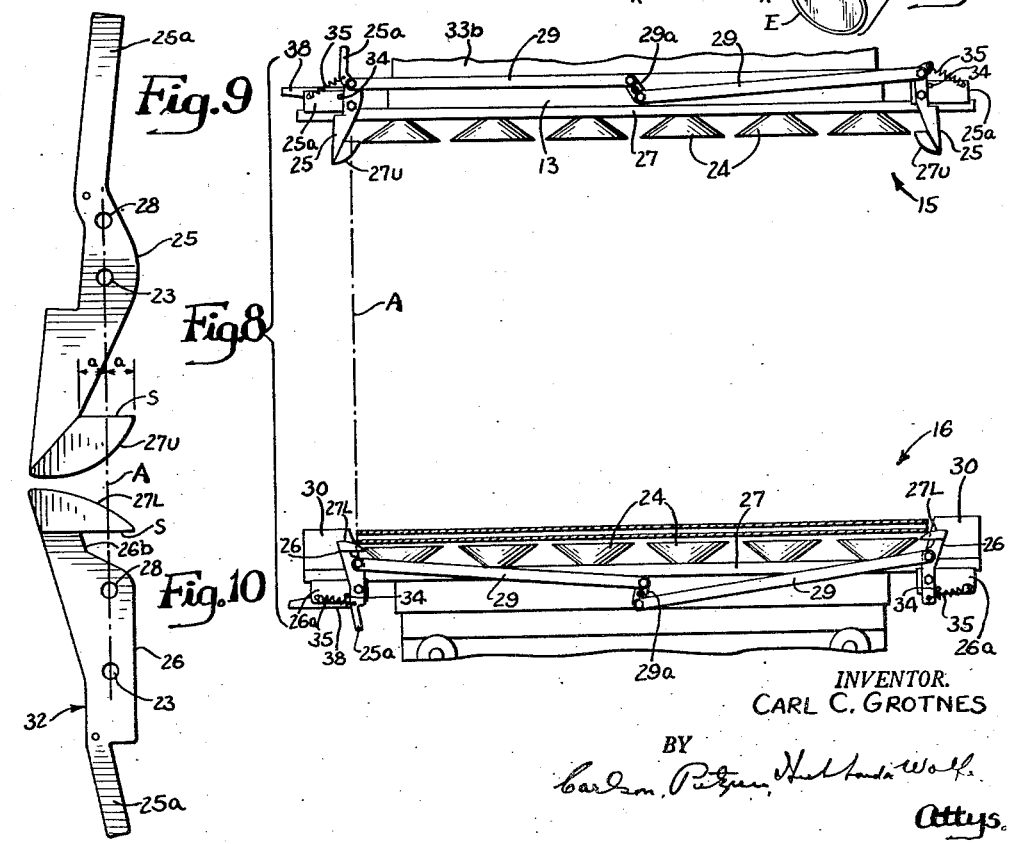
INVENTOR.
CARL C. GROTNES
BY
Attys.

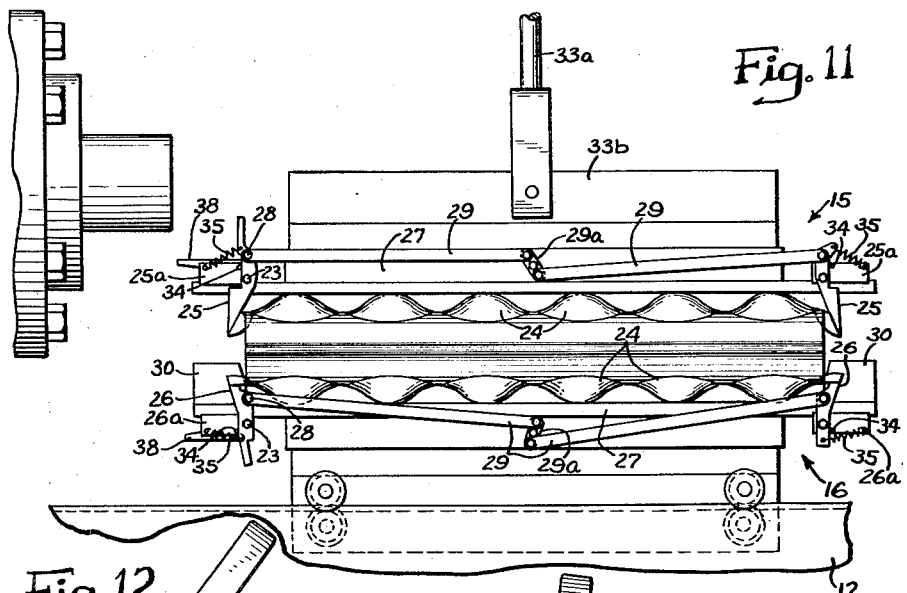
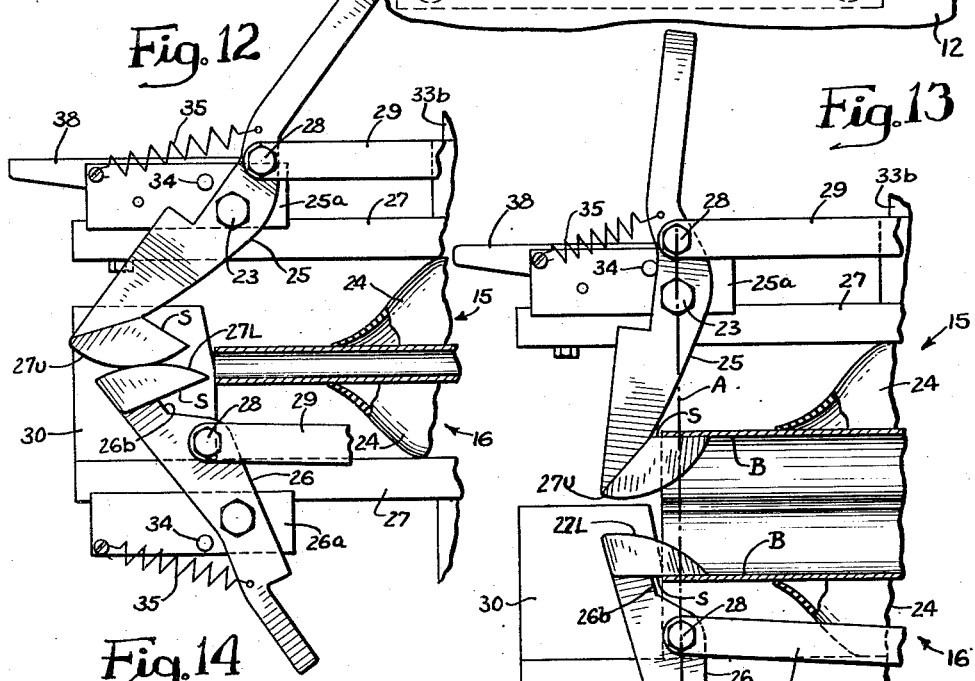
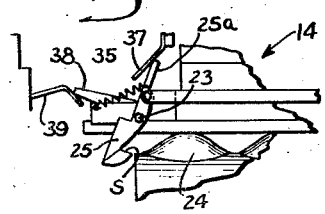

Nov. 5, 1957 C. C. GROTNES 2,812,002
APPARATUS FOR OPENING A HOLLOW FLATTENED CYLINDRICAL BODY
Filed June 13, 1952 3 Sheets-Sheet 3
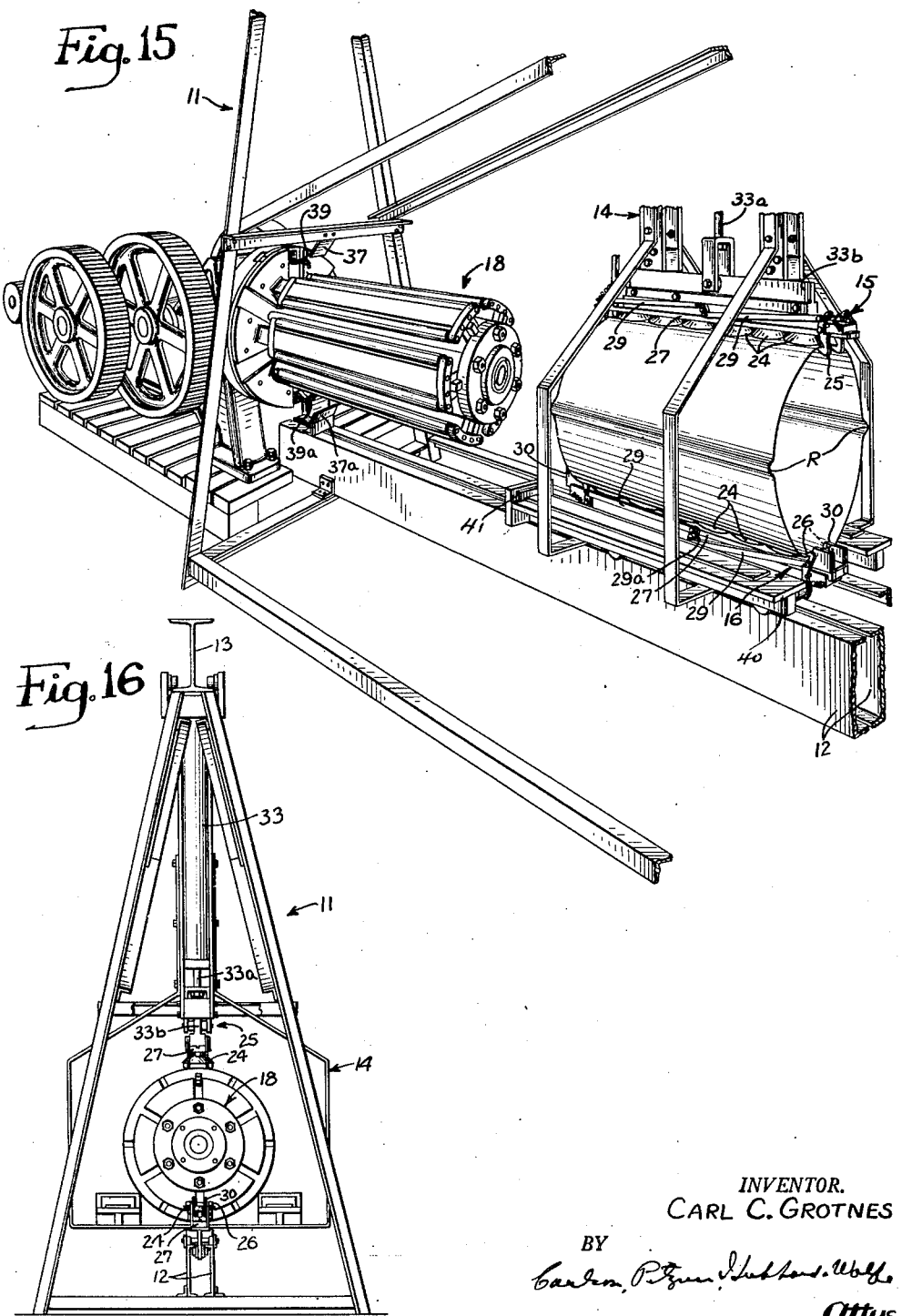
INVENTOR.
CARL C. GROTNES United States Patent Office 2,812,002
Patented Nov. 5, 1957

2,812,002

APPARATUS FOR OPENING A HOLLOW FLATTENED CYLINDRICAL BODY

Carl C. Grotnes, Park Ridge, Ill., assignor to Grotnes Machine Works, Inc., Chicago, Ill., a corporation of Illinois Application June 13, 1952, Serial No. 293,244

7 Claims. (Cl. 153—32)

The invention pertains to the manufacture of steel containers or drums of the type commonly used in the shipment and storage of oil and other products. More specifically, it relates to an apparatus for opening previously flattened, hollow drum bodies in the manufacture of drums according to the process set forth in copending application of Oscar Van Leer and myself, Serial No. 226,394, filed May 15, 1951, now Patent 2,733,502, issued February 7, 1956. In that application is disclosed an apparatus for opening previously flattened drum bodies comprising rows of opposed suction cups operative to grip the opposite sides of the flattened container bodies in order to expand them to such a diameter that they may be placed over an internally actuated positive expander for final shaping.

The principal object of this invention is to provide positively acting means for insuring the preliminary expansion or opening of such hollow, flattened bodies under the widely varying conditions which may be encountered in use.

A further object is to provide positively acting opening means working in cooperation with opposingly arranged external surface grippers, the latter functioning to effect initial separation of the opposite sides of hollow, flattened drum or container bodies thereby conditioning them for engagement by positively acting gripping elements.

Another object of my invention is to provide positively acting opening means including hooks with coacting cam surfaces disposed so that as the gripper heads approach each other the hooks retract from their working position remaining cocked for insertion between the edges of the flattened, hollow drums or containers.

Still another object of my invention is to provide for a mechanism for insuring adequate and complete release of the partially expanded open container body by all gripping devices in timed relation so as to effect a uniform snapping of the container body onto the expander at a predetermined location.

In the accompanying drawings:

Figure 1 shows in side elevation an apparatus by means of which the flattened bodies are restored to their original form.

Figs. 2–6 are perspective views showing respectively a cylindrical body; a flattened body formed by collapsing or flattening the cylindrical body; a stack of flattened bodies banded for shipment; the bodies partially expanded; and the body in an expanded form just prior to the final operation of restoring it to its true cylindrical form and size as shown in Fig. 2.

Fig. 7 is an exploded perspective view of the component parts of a conventional steel drum as such parts have been fabricated for assembly.

Fig. 8 is a partial side elevation showing the relationship between the gripper heads when the work is inserted.

Figs. 9 and 10 are detail views of the opposed hooks showing the geometry of the working surfaces and pivot points.

Fig. 11 is a partial side elevation showing the flattened body initially expanded by surface grippers and the hooks in engagement with the opposing side walls. The final expander appears fragmentarily on the left.

Fig. 12 is an enlarged fragmentary side view of the mating hooks prior to their movement into the flattened body, the latter shown in section.

Fig. 13 is a view similar to that shown in Fig. 12 at a subsequent point of time, however, showing the working relationship of the hooks with respect to the hollow, flattened body following initial separation.

Fig. 14 is a fragmentary view showing the hook and suction cup release mechanism in operative engagement.

Fig. 15 is a fragmentary perspective view of the apparatus of Fig. 1.

Fig. 16 is an end view looking from the right in Fig. 15.

As more clearly illustrated in Figs. 1–7, and also set forth in greater detail in said copending application Serial No. 226,394, a cylindrical body B1 is first formed by conventional rolling and welding techniques. The drum bodies B2 are then flattened, as more clearly illustrated in Fig. 3, and subsequently stacked and banded in bundles B3 for shipment as shown in Fig. 4.

Upon arriving at the fabrication site, the bundles are broken open and the hollow, flattened drum bodies B3 opened to the shape shown in Fig. 5. While held open, they are placed over an internally acting expander which restores the drums B4 to cylindrical form as shown in Figs. 2 and 6. The external edge ribs R are then rolled out in the manner described in said copending application Serial No. 226,394. Subsequently, the bodies are ribbed and flanged as shown in Fig. 7 and the ends E seamed in place.

In the above referred to copending application, an apparatus is disclosed for accomplishing all these steps. Fig. 1 shows the complete mechanism for carrying out the operation of expanding flattened bodies. It comprises a platform 10 for receiving the flattened bodies, an upright frame structure 11 providing tracks 12 and 13 for a carriage 14 having opposed gripping heads 15 and 16, and an expander mechanism 18 to which partially opened bodies are delivered by the carriage 14.

The flattened drum bodies are placed on the platform 10, the bands broken, and are then lifted one by one into position between the gripper heads 15 and 16. Upon expansion into cylindrical form, the gripper head carriage 14 is moved along tracks 12 and 13 to carry the body into position over expander 18. The grippers then release the initially expanded drum B3 and the expander 18 in turn brings the drum B4 to finished diameter D.

In the aforesaid application Serial No. 226,394, the entire opening of the flattened drum bodies, preparatory to the final expanding operation, is accomplished by external surface grippers comprising opposed rows of suction cups 24 on the gripper heads 15, 16. In order to insure effectual operation under all conditions I have provided positively acting internal gripping devices on the gripper heads. In the preferred embodiment of the invention these internal devices are in the form of hooks movable into engagement with the inner end surfaces of the opposing sides of the body at opposite ends thereof as the sides are separated by the separation of the gripper heads.

Referring now to Figs. 8 to 15, the positively acting hook means comprise two sets of upper and lower hooks 25 and 26. Figs. 9 and 10 show the hooks in considerably greater detail. As shown in Figs. 15 and 16 there are eight of such hooks arranged in parallel planes in the preferred embodiment of my invention. The gripper heads themselves may be of any suitable construction. As shown, each comprises a rigid bar 27 upon which are mounted in spaced relation the suction cups 24 and at opposite ends the hooks 25, 26.

The hooks 25 and 26 are mounted in pairs, facing inwardly, at the ends of the bars, with the hooks of each pair disposed in two parallel planes, each containing four of these hooks on opposite sides of the rows of suction cups. The hooks at opposite ends of each gripper head are connected for operation in unison by linkages consisting of links 29 pivoted to the hooks and to a short lever arm 29a pivoted centrally of the gripper head. Preferably, the hooks are pivoted on blocks 25a and 26a which may be secured adjustably on the ends of the bars 27. A pneumatic actuator 33 (Fig. 1) furnishes the power for the manually controlled reciprocating motion of the upper gripper head 15. As shown, the actuator has a piston rod 33a connected to a bar 33b rigid with the bar 27.

The upper and lower hooks are respectively provided with cam faces 27U and 27L. In the case of each pair of upper and lower hooks, the pivot points 28 of the connecting links 29, the pivot points of hooks 25, 26, and the perpendicular bisector of the working surfaces S are all along a single axis A (Fig. 9). In practice, it has been found most satisfactory to extend the working surface S of the hooks 25, 26 equidistant from the perpendicular axis A, as represented by dimensions $a-a$. Lower hook 26 has a recessed notch 26b provided to aid in the registering of the work in cooperation with the locating blocks 30 mounted at the ends of the lower gripper bar 27. Stop pins 34, Fig. 13, limit the inward travel of the hooks under the influence of springs 35. It will be noted (Fig. 8) that although locating blocks 30 for the flattened drum B2 have been provided, the ends of the flattened drum BE rest on the inwardly tilted cam faces 27L of lower hooks 26.

Upon actuating a suitable control valve (not shown), the pneumatic actuator 33 lowers the upper gripper head 15 toward the work. Prior to the completion of the downward travel of upper gripper head 15, the cam faces 27U and 27L of the opposing hooks 15, 16 contact each other. As best illustrated in Fig. 12, the hooks swing outwardly from the work because of the configuration of their cammed ends 27U and 27L. This allows the flattened drum B2 to drop as gauged by locator blocks 30 into contact with the lower gripper head suction cups 24.

As the head 15 continues downwardly, the suction cups are mechanically collapsed upon contacting the sides of the flattened drum. To augment as well as facilitate control of the suction cups they are actuated pneumatically after complete contact with the flattened drum. Thereafter, the air flow into the pneumatic actuator 33 is reversed to raise the head. In this operation the suction cups effect the initial expansion of the flattened body preparatory to the engagement therewith of the hooks 25, 26.

It will be observed that as a consequence of the relative separation of the upper and lower hooks 25, 26, the hooks are swung inwardly by the action of the coil springs 35 restrained only by the coaction of the cam faces 27L of the hooks. As illustrated in Fig. 13, when the upper and lower hooks return to their normal vertical alinement along axis A as determined by stop pins 34, the working surfaces S of said hooks engage the inner end portions of the now slightly expanded drum body B. It will be appreciated that prior to reaching this final operating position, the working surfaces S of the upper and lower hooks 25 and 26 are angled inwardly (Fig. 12), so that no contact is established between the working surfaces S of upper and lower hooks 25, 26 until the hooks are alined along a vertical axis as shown in Fig. 13. At this time the hook surfaces S lie flat against the inner faces of the flattened body and in the continued upward movement of the upper head, the body is positively expanded until the internal diameter of the body is somewhat in excess of the expander head 18. So that irregularities in shape of the flattened container bodies are more readily compensated for, the linkage 29, 29a on one side of the suction cups operates independently of the adjacent linkage on the same gripper head but on the other side of the suction cups.

When the proper diameter of the body has been reached, the gripper carriage 14 is moved along the rails 12 and 13 so as to carry the partially expanded drum into position over the expander 18, whereupon the body is released by the gripping elements and, due to its resiliency, snaps onto the expander.

It has been found that the release of the gripping efforts of both the suction cups 24 and hooks 25, 26 should occur as substantially simultaneously as commensurate with economical manufacturing tolerances. Any error or lost motion should be resolved in favor of releasing the hooks before the surface gripping elements. In order to accomplish this release, I have provided upper and lower stationary trip members 37 and 37a positioned for engagement with extensions 25a of the hooks 25, 26, and air release arms 38 on the head coacting with stationary trip members 39 and 39a. As illustrated in Fig. 14, when gripper head carriage 14 has moved into position over the expander 18, the hook release trips 37 are engaged by the respective hook release extensions 25a. The hooks then pivot about pivot point 23 releasing the working surface S from contact with the inner surface of the container body. At the same time, or shortly thereafter, the movement of the air release arms 38 engages the trip members 39 and 39a to cut off the vacuum to suction cups 24 as disclosed in said copending application Serial No. 226,394.

Thereafter, the entire gripper frame carriage 14 is returned to its starting position and another flattened drum B2 loaded in place while the expander 18 brings the drum B4 to its final internal diameter D. Ribs R may then be ironed out, restoring the drum to its original shape, as shown in Fig. 2. Subsequently, the drum B5 is flanged, beaded, and seamed to ends E by conventional methods thereby completing its assembly.

In practice, a flattened body to be opened is removed manually from the platform 10 and placed in position above the lower head 16, the upper head 15 being in elevated position. To aid in positioning the body, side rests 40 stationarily supported on opposite sides of the lower head are provided, and these rests are equipped with positioning stops 41. Thereupon, the upper head is lowered and the surface gripping suction cups 24 are pressed against the opposed sides of the body in the final portion of the descending movement of the upper head. Concurrently, the two sets of hooks 25 on the upper head engage with the two sets of hooks 26 on the lower head with a rolling action between the cam faces 27U and 27L such that the hooks move outwardly from the position shown in Fig. 8 to that shown in Fig. 12, such outward movement of the hooks occurring against the action of the springs 35.

Upon reversal of the upper head, a preliminary opening of the flattened body occurs under the action of the surface gripping devices or cups 24. As the opposing side walls of the body thus become separated, the hooks move inwardly into opposite ends of the body under the control of the cam faces 27U and 27L so that the entry of the hooks into the body is determined by the extent of separation of the opposing sides, such cam faces being so calculated as to permit entry of the hooks coincidentally with the preliminary opening to an extent sufficient to clear the hooks. In their innermost positions, the flat surfaces S of the hooks are disposed substantially parallel with the opposed inner surfaces of the side walls and, as clearly shown in Fig. 13, in the continued upward travel of the upper head 15, a positively acting expanding operation occurs.

It will be observed that in addition to the function of the surface gripping cups in effecting initial expansion of the flattened body, they assist in the final opening operation. Because the cups are disposed in rows extending throughout the length of the body, they contribute substantially to the opening operation by maintaining the opposing side walls of the body against transverse bending which might otherwise occur by reason of the engagement of the hooks with the ends only of the body. This is especially important in the case of drum bodies of substantial length. The opposing side portions are thus at all times under positive control, with a uniform expansion insured by the cooperation of the pneumatic and positive expansion elements.

I claim as my invention:

1. An apparatus for opening a hollow flattened drum body comprising a pair of opposed heads mounted for relative movement toward and from each other and each having external surface gripping means thereon positioned for engagement with opposed side portions of the body centrally of such portions, said means being operative upon a relative separating motion of the heads to effect a separation of said side portions, gripping devices mounted on said heads adapted for gripping the internal surface of said body, and means associated with said gripping devices operable to shift said gripping devices inwardly toward the ends of said body and into positive engagement with the opposed side portions at opposite ends of the body at a predetermined point in the opening of the body by said external gripping means.

2. An apparatus for opening a hollow flattened drum body comprising a pair of opposed heads mounted for relative movement toward and from each other and each having a plurality of external surface gripping devices thereon positioned for engagement with opposed side portions of the body at longitudinally spaced points centrally of such portions, said devices being operative upon relative separating motion of the heads to effect a separation of said side portions, gripping devices mounted on said heads adapted for gripping the internal surface of said body, and means operable to shift said gripping devices inwardly toward the ends of said body and into positive engagement with the opposed side portions at opposite ends of the body at a predetermined point in the opening of the body by said external gripping means.

3. An apparatus as described in claim 1 wherein the external surface gripping means comprise suction cups.

4. An apparatus for substantially completely opening a hollow flattened drum body having opposed side portions, comprising a pair of opposed heads mounted for relative movement toward and away from each other, means for partially opening said body to effect an initial separation of the side portions thereof, gripping devices movably mounted on said heads and adapted for gripping the internal surfaces of said body portions, means associated with said gripping devices operable to shift said devices inwardly toward the ends of said body and into positive engagement with the opposed side portions thereof at a predetermined point in the opening of the body by said partial opening means, and means for relatively separating said heads to thereby substantially completely open said drum body.

5. An apparatus for substantially completely opening a hollow flattened drum body having opposed side portions, comprising a pair of opposed heads mounted for relative movement toward and away from each other, means for partially opening said body to effect an initial separation of the side portions thereof, gripping members mounted on the respective heads for inward and outward movement with respect to the ends of said body for engaging internal edge portions thereof, means associated with said members for moving the members into a position clear of the ends of said body during approaching movement of said heads, means operative upon the initial relative separating motion of said body side portions to move said members inwardly and into engagement with said edge portions, and means for relatively separating said heads to thereby substantially completely open said drum body.

6. An apparatus for substantially completely opening a hollow flattened drum body having opposed side portions, comprising a pair of opposed heads mounted for relative movement toward and away from each other, means for partially opening said body to effect an initial separation of the side portions thereof, opposing hook members mounted on the respective heads for inward and outward movement with respect to the ends of said body for engaging internal edge portions thereof, said opposing hook members having cam faces coacting during relative approaching movement of said heads to move the hook members into a position clear of the ends of said body, biasing spring means operative upon the initial relative separating motion of said body side portions to move said hooks inwardly and into engagement with said edge portions, and means for relatively separating said heads to thereby substantially completely open said drum body.

7. An apparatus for substantially completely opening a hollow flattened drum body having opposed side portions, comprising a pair of opposed heads mounted for relative movement toward and away from each other, means for partially opening said body to effect an initial separation of the side portions thereof, opposing hook members pivotally mounted on the respective heads for normally engaging internal edge portions thereof, said opposing hook members having cam faces coacting during relative approaching movement of said heads to move the hook members into a position clear of the ends of said body, and means for relatively separating said heads to thereby substantially completely open said drum body.

References Cited in the file of this patent

UNITED STATES PATENTS

| Number | Name | Date |
|---|---|---|
| 756,832 | Cleveland | Apr. 12, 1904 |
| 1,736,016 | Rosener | Nov. 19, 1929 |
| 1,834,499 | Richter | Dec. 1, 1931 |
| 1,958,393 | Patterson | May 8, 1934 |
| 1,962,166 | Yost | June 12, 1934 |
| 1,962,269 | Dodge | June 12, 1934 |
| 1,984,600 | Sedwick | Dec. 18, 1934 |
| 2,254,250 | Taylor | Sept. 2, 1941 |
| 2,298,479 | Hallead | Oct. 13, 1942 |
| 2,436,409 | Thornburgh | Feb. 24, 1948 |
| 2,678,620 | Cote | May 18, 1954 |